3,526,559
PROCESS OF PRODUCING A STYRENE-MODIFIED PHENOLIC RESIN AND IMPREGNATING FIBROUS SHEET MATERIAL WITH THE RESIN
Edward Choloner Hale, Beaconsfield, Quebec, and Peter Stephen Kerekes, Montreal, Quebec, Canada, assignors to Domtar Limited, Montreal, Quebec, Canada, a Canadian company
No Drawing. Filed Jan. 25, 1967, Ser. No. 611,560
Claims priority, application Canada, Feb. 1, 1966, 951,274
Int. Cl. C08g 5/00, 5/08
U.S. Cl. 156—335          5 Claims

ABSTRACT OF THE DISCLOSURE

Resin characteristics, notably rate of cure and flow, of water-soluble phenolic resins are improved by incorporating therein styrene or a styrene derivative. By first reacting phenol with styrene or a styrene derivative in the presence of a Friedel-Crafts catalyst and thereafter reacting the addition reaction product so produced with formaldehyde in the presence of a fixed alkali catalyst a water-soluble phenolic resin is obtained which is especially suitable as a core stock resin in the manufacture of decorative laminates.

---

The present invention relates to water-soluble phenolic resins and more particularly, to modified water-soluble phenolic resins which are water-soluble and have improved resin characteristics, notably rate of cure and flow.

The term "water-soluble" as used herein, is applied to those modified or unmodified alkali-catalyzed condensation products of a phenol and formaldehyde that are substantially soluble at room temperature in the water present in the reaction mixture as a result of being added to the reaction mixture in the form of an aqueous solution of formaldehyde. This particular property makes it possible to eliminate the dehydration procedure normally required after formaldehyde condensation in the production of resins that are not water soluble as indicated by the existence of two phases with resin separating from water. With water-soluble resins, the water added in the form of the aqueous solution of formaldehyde is retained as solvent and in many cases may be solely instrumental in reducing the viscosity of the resin to a level suitable for proper application.

It has previously been known to modify phenolic resins by reacting styrene or one of certain styrene derivatives with a phenol and then adding an aldehyde to the unseparated reaction products, which include an aralkyl phenol, to produce an oil-soluble resin useful in the varnish industry as a drying oil additive (U.S. Pat. No. 2,602,076). It has also been known to incorporate in a water-soluble nuclear-alkylphenol-formaldehyde resin a plasticizer prepared by condensing styrene or alpha methyl styrene with a phenol in the presence of a Friedel-Crafts catalyst to form a plasticized nuclear-alkylphenol-formaldehyde resin composition which is then used to prepare laminates having good electrical and punching grade properties (Canadian Pat. No. 567,923). Another and more recent proposal has been the modification of a phenolic resin by first reacting phenol and styrene, then reacting a drying oil with the phenol-styrene reaction product, and finally reacting formaldehyde with the phenol-styrene-drying oil reaction product to produce an oil or alcohol soluble resin which is useful in preparing laminates having good electrical and punching grade properties. (Canadian Pat. No. 686,353.) It is apparent, however, that in each of the cited patents, the final product resulting from condensation with the aqueous solution of formaldehyde is subjected to at least a partial and in many cases a complete dehydration. Based on the above definition none of these modified resins qualify as a "water-soluble" resin.

In the decorative laminating art, it has been common practice to use alcohol-soluble instead of water-soluble phenol-formaldehyde resins to impregnate sheets of core material. By employing alcohol-soluble resins it has, of course, been necessary to replace all or substantially all of the water from the aqueous solution of formaldehyde with an alcohol to render the resin more suitable for proper impregnation. After a drying treatment the alcohol is removed. Such a procedure is wasteful and economically unfavourable. As can be readily appreciated, considerable cost saving would be accomplished if water-soluble resins could be used. A water-soluble resin, however, has a number of undesirable properties which will impair the quality of the finished laminate. When the core sheets are impregnated with a water-soluble resin such resin has a tendency to penetrate into the interfibre spaces rather than distribute itself evenly on the surface of each sheet. Moreover, a water-soluble resin, being alkali-catalyzed, generally tends to cure much too quickly to achieve proper resin flow. As a result there is an insufficient amount of free resin available on the surface to obtain a uniform coat, and unless the flow and distribution can be improved a good bond between adjacent sheets is not possible.

It is therefore the principal object of the present invention to provide water-soluble phenol-formaldehyde resins which have improved resin characteristics, notably rate of cure and flow, and are especially suitable as core resins for decorative laminates.

In accordance with the present ivnention, it has been found that the resin characteristics, notably rate of cure and flow, of an unmodified alkali-catalyzed, water-soluble phenol-formaldehyde resin are improved when it is modified by the incorporation of styrene or a styrene derivative. The present invention is based on the discovery that styrene or a styrene derivative, when incorporated into an unmodified alkali catalyzed water-soluble phenol-formaldehyde resin, prior to the condensation of the phenol and formaldehyde in the presence of a fixed alkali catalyst, imparts a substantial improvement in the desired resin characteristics without, however, affecting the water-solubility thereof.

Broadly, the preparation of the modified water-soluble phenol-formaldehyde resin consists of first reacting phenol with a modifier in the presence of a Friedel-Crafts catalyst and then adding formaldehyde to the addition reaction product of phenol and the modifier in the presence of a fixed alkali catalyst.

Modifiers contemplated for use with phenol include styrene and nuclear alkyl substituted styrene such as, for example, alpha-methyl styrene, alpha-ethyl styrene and alpha-methyl p-methyl styrene. Other styrene homologues are also expected to result in a water-soluble resin, but the degree of solubility is probably less. For reasons of availability and cost styrene is the preferred modifier.

Since an important aspect of the present invention is the water-solubility of the modified phenol-formaldehyde resin the degree of condensation is controlled to provide products having the required water-solubility. Only those phenols are selected which, under normal conditions conducive to water-solubility and without modification, would condense with formaldehyde in the presence of a fixed alkali catalyst to produce a water soluble phenol-formaldehyde. Phenol itself, is preferred, but very good results are also obtained with mixtures of phenol partly replaced with cresol, up to about 20% cresol. All percentages are by weight, unless otherwise stated.

The formaldehyde is added in the form an an aqueous solution and for convenience formalin, a 37% formaldehyde solution, or a 44% formaldehyde solution is used. Of course, other aqueous forms of formaldehyde may be used as well.

It is preferred, in preparing the resin, to first react styrene with an excess of phenol, from about 0.1 to about 0.5 mol of styrene per mol of phenol, at a pH below 5 in the presence of a Friedel-Crafts catalyst i.e. sulphuric acid, aluminum trichloride, boron fluoride, etc., from about .0025 to about .005 mol of catalyst per mol of phenol, and at a temperature of from about 20° C. to about 130° C. To the unseparated reaction product of styrene and phenol, which also contains unreacted phenol, is then added an aqueous solution of formaldehyde from about 0.9 to about 1.8 mol of formaldehyde per mol of phenol, in the presence of a fixed alkali catalyst i.e. sodium carbonate, sodium hydroxide, barium hydroxide, etc., from about 0.008 to 0.4 mol of catalyst per mol of phenol, and at a temperature of from about 70° to about 100° C. The reaction is continued until the proportion of unreacted formaldehyde is reduced to a level below 10%, based upon the total formaldehyde charged, and while the resin is still in aqueous solution.

The following example illustrates the preparation of a water-soluble styrene-modified phenol-formaldehyde resin and its application as a core resin:

A water-soluble resin for impregnating core sheet material is prepared by first charging 1 mol of phenol and .003 mol of concentrated sulphuric acid to a suitable reaction vessel, heating to a temperature of 60° to 70° C. and then adding 0.2 mol of styrene at a rate such that the temperature of the reaction mixture rises to a temperature of 90° to 100° C. without any external heating or cooling. After adding 0.018 mol of sodium carbonate in the form of a 10% solution 1.1 mol of formaldehyde in the form of a 44% aqueous solution are added. The mixture is then heated to 90° C., refluxed under reduced pressure for 30 to 60 minutes and cooled to 30° C. The resulting resin has the following properties:

Solids content—55 to 57%
Viscosity—30 to 45 cps.
Stroke time at 150° C.—250 to 300 sec.

For preparing the resin-impregnated core sheets to be used in the body of a test laminate, several sheets 60 lbs. per 3000 sq. ft. kraft paper are impregnated with the above resin to yield an impregnated sheet of a 30 to 35% resin content with the resin volatility and flow measured at 7 to 9% and 1 to 4%, respectively. If it is desired to alter the viscosity of the resinous solution a small amount of methanol or another suitable solvent may be added prior to treatment of the paper. The impregnated sheets are then dried, partially curing the resin.

A test laminate is prepared by arranging the impregnated sheets one on top of the other, placing a melamine impregnated decorative sheet on the uppermost sheet, and pressing the laminating assembly at a temperature of 140° C. for about 30 to 40 min. The laminate was tested for flexibility, post-forming water-absorption and bonding strength, and it was found to be satisfactory in every respect, also meeting the requirements of the National Electrical Manufacturers Association (NEMA) "Decorative Laminated Phenolic Products Standards."

For the purposes of comparison the following table shows properties of the styrene-modified resin as compared to the unmodified resin:

STYRENE-MODIFIED RESIN

| | |
|---|---|
| Pickup, percent | 30.4 |
| Volatile content, percent | 10.1 |
| Flow, percent | 4.0 |
| Stroke time (sec.) at 150° C. | 280 |

UNMODIFIED RESIN

| | |
|---|---|
| Pickup, percent | 31.3 |
| Volatile content, percent | 9.8 |
| Flow, percent | 0.9 |
| Stroke time (sec.) at 150° C. | 86 |

As will be observed from the table the modified resin has a higher flow characteristic as well as a longer stroke time. Even with a pickup of 31.3% the flow of the unmodified resin is low as compared to the modified resin.

The stroke time or dry rubber end point is determined by stroking a sample of the resin, approximately 0.5 ml., on a clean hot plate at a temperature of about 150° C. with a clean spatula until the resin can no longer be drawn into strings. Although the end point is not a measure of the final cure it is significant as it shows the rate of cure from the thermoplastic to the thermosetting stage. A longer stroke time indicates a longer thermo-plastic flow period and in the case of the modified resin it is observed that the slower cure has contributed to a considerable increase in flow.

We claim:
1. In a process for the manufacture of laminates, the steps of:
  forming an aqueous thermosetting resin solution consisting essentially of the reaction product obtained by
    reacting one mol of a monohydric phenol of the group consisting of phenol and mixtures of phenol and up to 20% cresol with 0.1 to 0.5 mol of a styrene compound of the group consisting of styrene and alkyl-substituted styrene in the presence of a catalytic quantity of a Friedel-Crafts catalyst at a temperature 20° C.–130° C. thereby forming a reaction mixture of a styrenated phenol and unreacted phenol,
    adding to said reaction mixture an aqueous solution of formaldehyde in an amount of 0.9–1.8 mol of formaldehyde per mol of phenol,
    maintaining said reaction mixture with added formaldehyde in the presence of a fixed alkali catalyst at a temperature 70° C.–100° C. thereby to cause a phenol-formaldehyde condensation reaction,
    terminating said reaction when the amount of unreacted formaldehyde is reduced to below 10% of formaldehyde added and while the resin is still in aqueous solution;
  impregnating paper sheet material with said aqueous thermosetting resin solution;
  arranging the impregnated sheet material into a laminating assembly; and
  pressing the laminating assembly at elevated temperature and pressure to form a laminate.

2. The method of claim 1 wherein said styrene compound is styrene.

3. The method of claim 1 wherein said styrene compound is alpha-methyl styrene.

4. The method of claim 1 wherein said styrene compound is nuclear methyl styrene.

5. The method of claim 1 wherein one mol of phenol is reacted with 0.2 mol of said styrene compound.

(References on following page)

References Cited

UNITED STATES PATENTS

| | | | |
|---|---|---|---|
| 2,114,121 | 4/1938 | Bender | 106—22 |
| 2,247,402 | 7/1941 | Perkins et al. | 260—619 |
| 2,432,356 | 12/1947 | Underwood | 260—619 |
| 2,602,076 | 7/1952 | Teot | 260—51 |
| 2,859,205 | 11/1958 | Lection | 260—51 |
| 3,228,899 | 1/1966 | Elmer et al. | 260—19 |
| 3,373,127 | 3/1968 | Bean et al. | 260—28 |

OTHER REFERENCES

"Styrene," Boundy et al., 1952, pp. 825, 832–833 and 839–841.

Chemistry of Phenolic Resins, Martin, 1956, pp. 20–21 and 87–88, 96–99.

Chem. Abstracts, vol. 53, 1959, 10595g–h, Nakasawa et al.

WILLIAM H. SHORT, Primary Examiner

H. SCHAIN, Assistant Examiner

U.S. Cl. X.R.

156—228, 331; 260—51, 57, 29.3, 33.4; 161—264; 117—161